Figure 1:
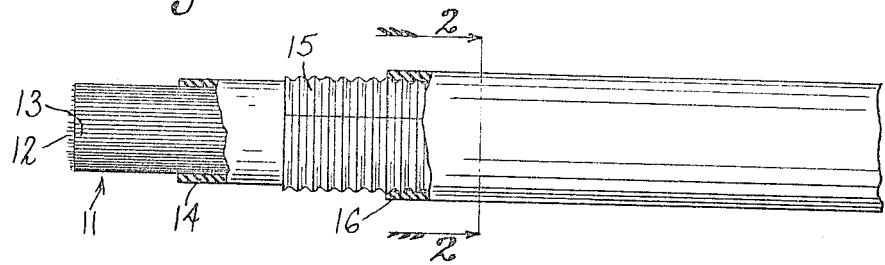

INVENTORS
Gordon C. Rollins
William A. Fallon

BY Rockwell and De Lio
ATTORNEYS

United States Patent Office 3,272,911
Patented Sept. 13, 1966

3,272,911
SHIELDED CABLE CONSTRUCTION
Gordon C. Rollins, Cumberland, and William A. Fallon, Riverside, R.I., assignors to The Ansonia Wire & Cable Company, Ashton, R.I., a corporation of Connecticut
Filed Apr. 14, 1964, Ser. No. 359,636
12 Claims. (Cl. 174—106)

This invention relates generally to a shielded cable construction and more specifically to the utilization of improved shielding in multi-conductor cables such as the class of cables known as telephone communication, signal, power and control cables. While not so limited, the invention is especially directed to an improvement in the construction of cables known as fully color-coded, polyethylene-insulated, double polyethylene-jacketed telephone cables for direct burial and/or overhead transmission. Cables of this general type are fully shielded with a shielding designed to perform both electrical and mechanical functions.

Buried communication cables are normally constructed as follows. The core of the cable consists of one or more insulated conductors wrapped with a non-hygroscopic tape. Surrounding the core is an inner insulating jacket which, in telephone cables, primarily consists of a polyethylene jacket, although polyvinyl chloride jackets are sometimes utilized. Surrounding the inner jacket is a longitudinally applied shielding of corrugated copper whose thickness is either 5 mils or 10 mils depending on environmental factors. The outermost layer consists of a polyethylene jacket.

Cable of this type is generally manufactured in accordance with particular specifications, such as those established by the Rural Electrification Administration of the United States Department of Agriculture. REA Bulletin 345–14 specifies that the copper shielding for standard cable shall be 5 mils thick, while the shielding for cables designed for gopher protection shall be 10 mils thick. While the 5-mil thickness of shielding in standard cables is more than adequate as regards electrical requirements, the additional thickness of shielding for gopher-protected cables increases the mechanical properties of such cables to provide increased resistance to damage and failure due to gopher attack.

Aerial cables have a core similar to that of the buried cables. The core is provided with a dielectric tape separator which is then wrapped with a shielding of 8-mil longitudinally applied corrugated aluminum. As in the case of the buried cables, the outer jacket is polyethylene. In both types of cables, the primary purpose for the shielding is grounding, lightning, electrostatic and mechanical protection.

Cables have been and are being manufactured with steel shieldings primarily for mechanical protection. It is well known that the conductivity of steel as compared with copper or aluminum, is extremely low and thus steel shieldings having suitable conductivity would necessarily be quite thick. Because of the thickness, it has not been found practicable to fabricate currugated steel shieldings and thus the majority of steel shieldings are in the form of spiral wraps. As may well be imagined, the mechanical properties of a steel shielded cable are far superior and the thickness of shielding for gopher-protected cables could be substantially less if a steel shielding were used. Of course, such a shielding would not meet the REA specification mainly because of the conductivity factor.

By combining metals having various mechanical and electrical properties, it may be possible to produce a shielded cable having improved properties. The term "metal" as used throughout this application, is used in its broad sense, meaning either an elementary metal or an alloy. Prior to the instant invention, it has not been feasible to produce a cable having a single shielding element efficiently and simply combining the properties of two or more metals.

Accordingly, a principal object of this invention is to provide a shielded cable incorporating shielding material having superior mechanical and electrical properties as compared with prior known constructions.

Other objects and advantages of the invention will in part be obvious and will in part be apparent from the specification.

Generally speaking, in accordance with the invention, a telephone or communication cable is fabricated utilizing known methods and incorporating a shielding composed of two or more metals integrally bonded in a suitable thickness to provide the necessary mechanical and electrical properties for the particular application.

The invention accordingly comprises the features of construction, combination of elements and arrangement of parts which will be exemplified in the construction hereinafter set forth, and the scope of the invention will be indicated in the claims.

Figure 2:
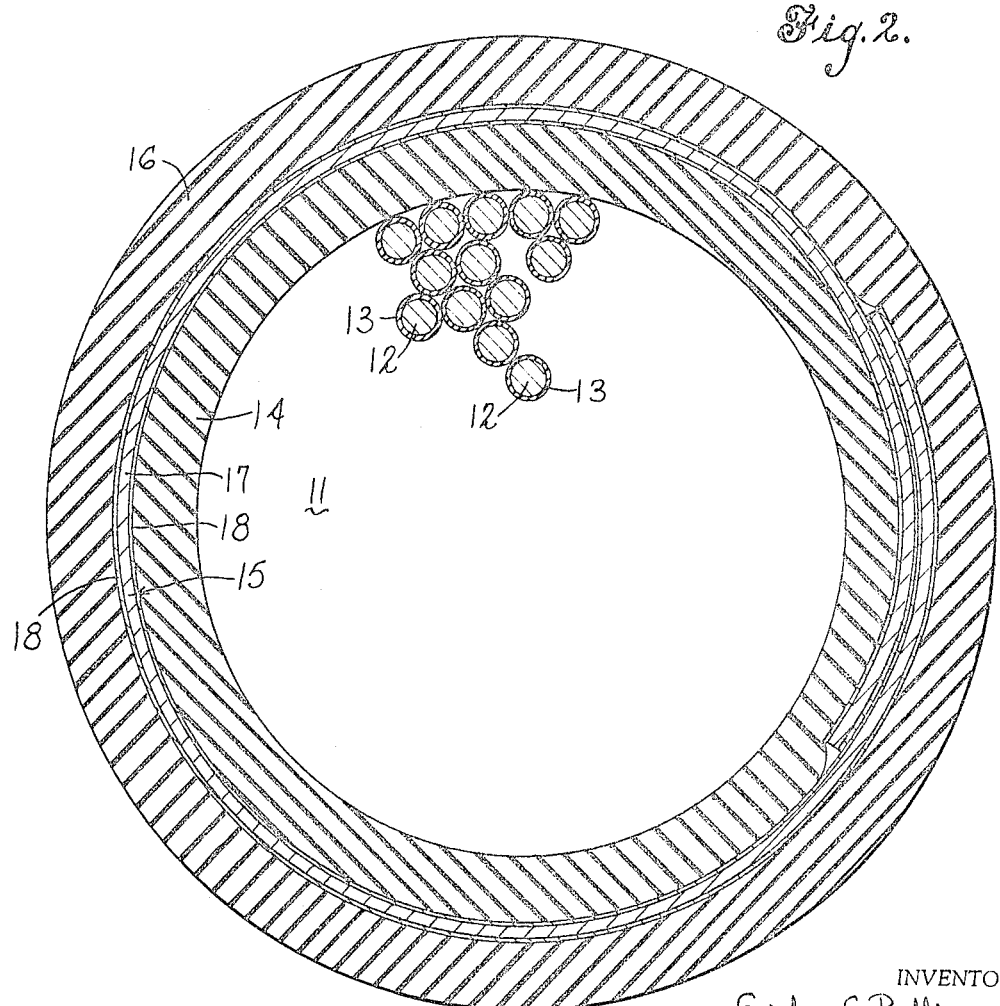

For a fuller understanding of the invention, reference is had to the following description taken in connection with the accompanying drawing, in which:

FIG. 1 is an elevational view, partly in section, with certain portions being broken away for the sake of clarity, of a length of cable constructed in accordance with the invention; and FIG. 2 is a sectional view taken along line 2—2 of FIG. 1 showing a cross section of the cable at a greatly enlarged scale, with most of the central conductors being omitted for ease of illustration.

A typical cable section constructed in accordance with the invention is shown in the drawing. The core of the cable indicated generally at 11, is composed of a plurality of conductors 12 each covered with an insulation 13. The cable core is completely encased by an inner jacket 14 of insulating material. Polyethylene is primarily used for the inner jacket in telephone cables. A shielding 15 surrounds the inner jacket and the shielding is, in turn, surrounded by an outer jacket 16 also generally of a polyethylene material.

As best shown in FIG. 1, shielding 15 is corrugated to permit installation of the cable without fracture of the shielding and to provide a suitable degree of flexibility. A cable having an uncorrugated shield would tend to kink on bending and might fracture. The corrugations, on the other hand, have an accordion effect to allow the cable to meet standard industry bending tests such as those established in the REA specifications. As best shown in FIG. 2, the edges of the shielding are overlapped to assure complete shielding of the cable core and minimal separation during bending. The ends of the shielding are held in contact by the mechanical pressure applied to the overlap by the outer jacket which is formed directly over the cable shielding. The shielding 15 shown in FIG. 2, is recommended for use in standard as well as gopher-protected buried telephone cables. As an example, shielding 15 consists of an inner layer of steel 17 sandwiched between layers of copper 18. The copper and steel form an integral shielding fabricated by solid-phase bonding, such as by means of the method taught by U.S. Patent 2,691,815 issued October 19, 1954. In order to meet both the mechanical and electrical requirements established in the aforementioned REA Bulletin, the overall thickness of shielding 15, in this example, is 6 mils or .006 inch. The relative thicknesses of the layers is in the ratio of 10–80–10, thus providing an overall thickness of 1.2 mils of copper and 4.8 mils of steel. Not only does the presence of the steel in the shielding provide greatly improved mechanical properties, but it also provides electromagnetic shielding of the core while continuing to provide electrostatic shielding due to the presence of the copper. In prior cables of this type, only electrostatic shielding was provided.

In order to establish the superiority of cable constructed in accordance with the instant invention, as compared with gopher-protected, buried telephone cable, a considerable number of comparative tests were run. Several cable constructions were compared with cable of similar design meeting the REA specifications and having a copper shielding whose thickness was 10 mils. Tests were run on shielding consisting of a low-carbon (L.C.) steel bonded between layers of copper in a ratio of 10–80–10 (total thickness 6 mils), on shielding consisting of a low-carbon steel bonded between layers of copper in a ratio of ⅓–⅓–⅓ (total thickness 6 mils), and on shielding consisting of stainless steel bonded between layers of copper in a ratio of ⅓–⅓–⅓ (total thickness 6 mils), and on finished cable fabricated with the various shieldings. The finished cable was 25 pair, #19 AWG Direct Buried–PE–23, corrugated shielded cable. The test results are set forth in the following table:

Cable having bi-metal shielding in the broad sense is deemed to be known in the art. Copper has been tinned to prevent poisoning thereof by rubber insulation. Steel has been electrogalvanized or hot-dipped and other metals have been plated with dissimilar metals for incorporation into transmission cables. However, such prior known constructions are quite remote from the teachings of the instant invention. The known coatings are principally for corrosion resistance because the thin coatings do not substantially increase the conductivity of low-conductivity base metals. While hot-dip galvanizing usually applies a relatively thick layer to the base metal, the thickness of the coating on each side usually cannot be accurately controlled, particularly where a continuous strip is involved. Furthermore, the bond of a hot-dip coating is quite weak and flake-off of the coating during bending would be a common occurrence. By utilization of a solid-phase bonded metal, layer thicknesses of substantially any dimension can be selected and readily obtained. The inherent properties of the shielding strip negate characterizing the outer metal as a "coating" because a composite metal, metallurgically bonded, is actually formed. Thus, failure due to flake-off will not occur. Furthermore, the

|  | Copper-L.C. Steel-Copper 10-80-10 | Copper-L.C. Steel-Copper ⅓-⅓-⅓ | Copper-Stainless Steel-Copper ⅓-⅓-⅓ | Solid Copper 100% |
|---|---|---|---|---|
| MECHANICAL PROPERTIES (SHIELDING) | | | | |
| Thickness | .006″ | .006″ | .006″ | .010″. |
| Tensile Strength (p.s.i.) | 55,200 | 33,500 | 37,000 | 33,800. |
| Yield Strength (p.s.i.) | 48,100 | 26,500 | 24,000 | 12,500. |
| Elongation —2″ length | 15% | 13.5% | 12.5% | 41.5%. |
| Spring back | 24° | 21° | 18° | 9°. |
| Bends to fracture (shielding laid flat) | 9½ | 8½ | 13 | 6½. |
| ELECTRICAL PROPERTIES (SHIELDING) | | | | |
| Resistivity (Ohms CMF) | 34.2 | 15.6 | 15.3 | 10.4. |
| Electrical conductivity (percent IACS) | 30.65 | 67.0 | 68.5 | 100. |
| PHYSICAL PROPERTIES (SHIELDING) | | | | |
| Thermal expansion Coefficient (In./In./° F.) | $7.3 \times 10^{-6}$ | $7.5 \times 10^{-6}$ | $7.5 \times 10^{-6}$ | $16.8 \times 10^{-6}$. |
| Modulus of elasticity | 25 | 25 | 25 | 17. |
| Density (#/cu. in.) | .291 | .296 | .292 | .323. |
| MECHANICAL PROPERTIES (FINISHED CABLE) | | | | |
| Impacts to Failure: | | | | |
| 35 ft. lbs | 9 | 8 | 8 | 7. |
| 15 ft. lbs | 33 | 40 | 30 | 22. |
| Flexing Cycles (180°) | 1,556 | 560 | 645 | 63. |
| REA U-bend cycle test | 9 | 3 | 3 | 2. |

By substituting stainless steel for the low-carbon steel, greater resistance to corrosion is provided for cable installed in corrosive environments.

The shield materials and thicknesses set forth in the foregoing examples are for purposes of illustration and demonstration of the superior results that can be obtained by incorporation of bi-metal, solid-phase bonded materials in shielded cable. The specific materials and constructions set forth in the examples are preferred constructions designed to meet present standard specifications for direct buried cable. However, the invention herein is not deemed to be limited to a cable construction incorporating a copper-steel-copper shielding. Cables for aerial transmission may be constructed incorporating an aluminum-steel-aluminum shielding or a copper-aluminum-copper shielding. With the aluminum-steel-aluminum construction in the proper proportions, the substantial increase in strength could render unnecessary the provision of a cable messenger for carrying the aerial cable, without sacrificing the electrical properties imparted by the aluminum shielding. A copper-aluminum-copper shielding would provide increased shield conductivity for lightning protection, especially in heavy lightning areas.

integral metallurgical bonding of the metals prevents electro-osmosis which might otherwise occur. Where used throughout the specification and in the claims, the phrase "metallurgically bonded" is thus defined to mean composite metals bonded together by means of a solid-phase bonding process.

Materials produced by the solid-phase bonding of metals as taught in U.S. Patent 2,691,815, have been successfully used in the manufacture of electronic tubes. The performance requirements of articles of such a nature are so remote from the art to which the instant application pertains, that solid-phase bonded metal strip was originally considered to have no application in the cable art. However, experimentation with various bi-metal strips incorporating dissimilar metals of varying thicknesses, has proven the superiority of such cables. From the test results cited above, the superiority of such cables cannot be questioned. For example, shields of copper and steel each with a total thickness of 6 mils, as compared with a solid copper shield 10 mils, thick, showed substantial increase in the yield strength while at least maintaining the tensile strength with an overall thickness reduction of 40%. The effects of temperature change on expansion was reduced by more than 50% and the density which affects the overall weight also was reduced. The primary cause of shielding failure is fracture due to bending during installation. The bending test demonstrated that the number of bends to fracture increased from 50 to 100%, while the flexing cycle test of finished cable gave unusually good results. As expected, the resistivity increased while the conductivity, using copper as a base for measuring, was reduced. However, in shield having ⅓–⅓–⅓ proportions, the increase in resisitivity and decrease in conductivity was relatively small. In any event, the primary purpose of conductivity in cable shielding is lightning protection, that is, to draw off the surge from a lightning strike, and for grounding. Cable constructed in accordance with the test samples will more than adequately meet the requirements for grounding and lightning protection. In such cables, the copper will continue to provide electrostatic shielding while the steel, as discussed above, will improve the shielding properties of this type of cable by adding electromagnetic shielding to the other properties of the cable.

While the majority of communication cables of the type under discussion will preferably utilize a corrugated solid-phase bonded bi-metal shielding, in certain applications the corrugation of the shielding is not practicable. In applications requiring extra-heavy shielding and in very small cable having only a few conductors, it may only be practicable to apply the shielding in the form of a spiral wrap. A shielding applied in such a manner will not, however, detract from the advantages gained utilizing the solid-phase or metallurgically bonded bi-metal strip as heretofore described.

As previously mentioned, a number of different shieldings can be utilized using the teachings of the instant invention. For example, the shielding could consist of copper on steel, copper on aluminum, aluminum on copper, aluminum on steel, steel on aluminum, or steel on copper. If the shielding were composed of steel on aluminum, or steel ond copper, the thickness of the steel should be no less than 50% of the total thickness of the shielding strip. When copper or aluminum is bonded to other metals, the thickness of copper or aluminum should be no less than 10% of the total thickness of the shielding strip. For example, a shielding composed of steel metallurgically bonded between layers of copper, must have the metals in the ratio of at least 5 copper-90 steel-5 copper, while optimum results were obtained from a shielding having the meals in the ratio of 10 copper-80 low-carbon steel-10 copper.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A communication cable comprising a plurality of conductors forming a central core, an inner insulating jacket surrounding said core, a shield surrounding said inner jacket and an outer insulating jacket surrounding said shield, said shield comprising a first metal metallurgically bonded between two layers of a second metal, the total thickness of said second metal being no less than 10% of the total thickness of said shield.

2. A communication cable comprising a plurality of conductors forming a central core, an inner insulating jacket surrounding said core, a shield surrounding said inner jacket and an outer insulating jacket surrounding said shield, said shield being corrugated along its entire length and comprising a first metal metallurgically bonded between two layers of a second metal, the total thickness of said second metal being no less than 10% of the total thickness of said shield.

3. A communication cable comprising a plurality of conductors forming a central core, an inner insulating jacket surrounding said core, a shield surrounding said inner jacket and an outer insulating jacket surrounding said shield, said shield being corrugated along its entire length and having the edges thereof overlapping one another and comprising a first metal metallurgically bonded between two layers of a second metal, the total thickness of said second metal being no less than 10% of the total thickness of said shield.

4. A communication cable comprising a plurality of conductors forming a central core, an inner insulating jacket surrounding said core, a shield surrounding said inner jacket and an outer insulating jacket surrounding said shield, said shield comprising a first metal metallurgically bonded between two layers of a second metal, the layers of said second metal on opposite sides of said first metal being of equal thickness, the total thickness of the two layers of said second metal being no less than 10% of the total thickness of said shield.

5. In a cable including central conductors within an insulating jacket, a corrugated shield surrounding said central conductors comprising a layer of a first metal and two layers of a second metal, said layer of said first metal being metallurgically bonded between the layers of said second metal, the total thickness of said second metal being no less than 10% of the total thickness of said shield.

6. In a cable including central conductors within an insulating jacket, a corrugated shield surrounding said central conductors comprising a layer of a first metal and two layers of a second metal, said layer of said first metal being metallurgically bonded between the layers of said second metal, the layers of said second metal being of equal thickness and the total thickness thereof being no less than 10% of the total thickness of said shield.

7. In a cable including central conductors within an insulating jacket, a corrugated shield surrounding said central conductors comprising a layer of steel, a first layer of copper, and a second layer of copper, said layer of steel being metallurgically bonded between said first and second layers of copper, said first and second layers of copper being of equal thickness, the total thickness of said layers of copper being no less than 10% of the total thickness of said shield.

8. In a cable including central conductors within an insulating jacket, a corrugated shield surrounding said central conductors comprising a layer of low-carbon steel, a first layer of copper, and a second layer of copper, said layer of low-carbon steel being metallurgically bonded between said first and second layers of copper, said first and second layers of copper being of equal thickness, the total thickness of said two layers of copper being 20% of the total thickness of said shield.

9. In a cable including central conductors within an insulating jacket, a corrugated shield surrounding said central conductors comprising a layer of stainless steel, a first layer of copper, and a second layer of copper, said layer of stainless steel being metallurgically bonded between said first and second layers of copper, said first and second layers of copper being of equal thickness, the total thickness of said two layers of copper being two-thirds of the total thickness of said shield.

10. In a cable including central conductors within an insulating jacket, a corrugated shield surrounding said central conductors comprising a layer of aluminum, a first layer of copper, and a second layer of copper, said layer of aluminum being metallurgically bonded between said first and second layers of copper, said first and second layers of copper being of equal thickness, the total thickness of said two layers of copper being no less than 10% of the total thickness of said shield.

11. In a cable including central conductors within an insulating jacket, a corrugated shield surrounding said central conductors comprising a layer of steel, a first layer of aluminum, and a second layer of aluminum, said layer of steel being metallurgically bonded between said first and second layers of aluminum, said first and second layers of aluminum being of equal thickness, the total thickness of said two layers of aluminum being no less than 10% of the total thickness of said shield.

12. In a cable including central conductors within an insulating jacket, a corrugated shield surrounding said central conductors comprising a layer of low-carbon steel, a first layer of copper, and a second layer of copper, said layer of low-carbon steel being metallurgically bonded between said first and second layers of copper, said first and second layers of copper being of equal thickness, the total thickness of said two layers of copper being two-thirds of the total thickness of said shield.

References Cited by the Examiner

UNITED STATES PATENTS

| 1,702,332 | 2/1929 | Apt | 174—107 |
| 2,589,700 | 3/1952 | Johnstone | 174—106 |
| 2,691,815 | 10/1954 | Boessenkool et al. | |

FOREIGN PATENTS

| 650,432 | 2/1951 | Great Britain. |

LEWIS H. MYERS, *Primary Examiner.*

JOHN F. BURNS, *Examiner.*

D. A. KETTLESTRINGS, *Assistant Examiner.*